Aug. 7, 1928.

C. R. HASKELL 1,679,660

PROCESS FOR MAKING TUBULAR FARINACEOUS ROLLS

Filed June 21, 1926

Inventor
Charles Ray Haskell.
E. W. Anderson

By

Attorney

Patented Aug. 7, 1928.

1,679,660

UNITED STATES PATENT OFFICE.

CHARLES RAY HASKELL, OF YOUNGSTOWN, NEW YORK, ASSIGNOR TO HASKELL CORPORATION, OF NIAGARA FALLS, NEW YORK, A CORPORATION OF NEW YORK.

PROCESS FOR MAKING TUBULAR FARINACEOUS ROLLS.

Application filed June 21, 1926. Serial No. 117,408.

The invention has relation to a process for making tubular farinaceous rolls, having for an object to facilitate the making thereof, the invention being particularly designed for the making of bread rolls, wherein the dough must be raised and afterwards baked, the raising of the dough being a necessary step in the process.

Applicant is aware that it is old to dip a former or mold into batter such as used for making batter cakes or the like to cause the batter to adhere to the outside of said mold in cup form, and to immediately thereafter dip said mold into a bath of hot liquid fat to hold the batter from dropping from said mold and to fry said batter in molded form; and also that it is old to wind a strip of pastry dough spirally around a former or mold and bake the same upon the mold, resulting in a roll having spiral grooved outside formation and a longitudinal perforation.

Figure 1:
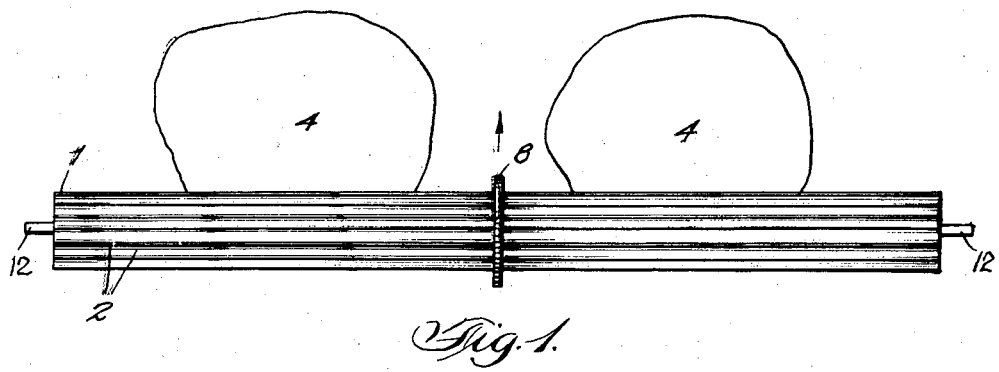
Figure 2:
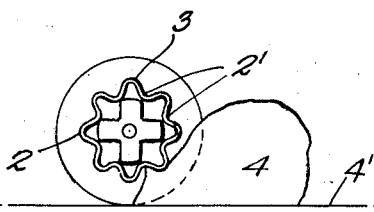
Figure 3:
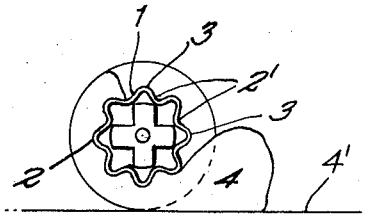
Figures 4, 5:
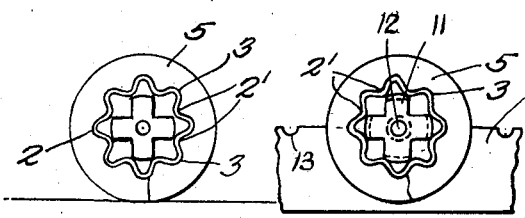
Figure 6:
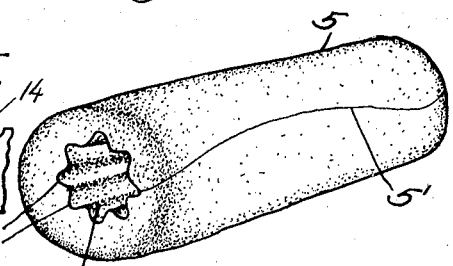
Figure 7:
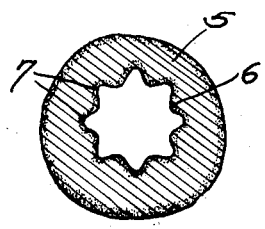

The invention consists in the novel procedure set forth in the appended claims.
In the accompanying drawings, illustrating the steps of the process and the preferred form of device for carrying out the process, Figure 1 is a plan view of said device or core roller showing pieces of dough engaged thereby; Figures 2, 3, 4 and 5 are end views of said core roller, showing respectively the dough engaged by said core roller, partly rolled around the same, completely rolled around the same, and suspended from said core roller for raising and baking purposes; Figure 6 is a perspective view of the finished roll, and Figure 7 is a transverse sectional view of the same.

In these drawings, the numeral 1 designates a core roller, having a plurality of straight longitudinal corrugations 2, extending in continuous series around the same, said core roller being basically of hollow cylindrical form and said corrugations including grooves 2', located between ridges 3.

The function of the longitudinal corrugations of said core roller is to adapt the same to pick up or accumulate thereon the dough lump 4 from which the farinaceous roll is made in the rolling pressure of said core roller upon the dough lump, the latter resting upon a support or table 4', whereby the dough is distributed around said core roller in the shape of a tubular roll 5, having a sealed longitudinal joint 5' extending from end to end along one side portion only thereof, said roll with said core roller contained therein being then, after the dough of the roll is raised, placed in an oven wherein it is baked, the tubular walls of the roll, which are of approximately the same thickness throughout, although subject to natural irregularities, being in the baking caused to expand under the action of the yeast or baking powder constituent to several times their original volume or thickness, after which the tubular roll is stripped from said core roller by being slid endwise thereof, the straight longitudinal nature of the corrugations 2 admitting of such removal without mutilation or crumbing of the lining 6 of the interior or bore of the roll, said lining conforming to or being molded by said corrugations, so that it also is provided with straight longitudinal corrugations 7.

Should the roll be made of cake, raising of the cake batter is not needed.

The tubular roll in the baking thereof is provided with crust upon the outside thereof as usual and also upon the lining of the longitudinal perforation thereof.

In the making of tubular rolls of bread dough it is necessary that the tubular roll remain upon or be suspended transversely from said core roller during the raising of the dough, in order that the tubular roll of dough shall be maintained against collapse, and further in order that the outer surface of the roll of dough shall be free and exposed, and it is also necessary that the roll of dough shall remain upon or be supended from said core roller during the baking. For this purpose the core roller 1 is provided at each end with a plug 11 bearing a central pin 12, said core roller being thereby adapted to be supported in raised position in the oven by engagement of said pins with seats 13 of a support 14.

It is found in practice that the grooves between the ridges of the straight longitudinal corrugations 7 of the lining of the longitudinal bore of the roll, admit of a sausage being inserted within said bore through an open end thereof, with mustard or other condiment, so that the condiment will remain in said grooves and not be pushed out from said bore as would be the case with a smooth walled longitudinal bore, the result being a more tasty article of food. Obviously the same result would be accomplished with a single straight longitudinal corrugation or groove or recess.

In the drawings a double form of the device for making the roll is shown, two aligned twin core rollers 1 being united end to end and carrying centrally thereof a transverse annular laterally projecting gage 8, common to both core rollers and of a diameter greater than that of said core rollers, said gage in the rolling pressure of said core rollers upon the platform 4' limiting the thickness of the side walls of the tubular rolls of dough accumulated thereon.

I claim:

1. A process for making tubular farinaceous rolls, consisting in first forming through rolling pressure between two surfaces one of which is that of a core roller and the other that of a support a lump of dough about said core roller into tubular form and uniting the longitudinal joint thereof to hold the roll in form, second, baking the roll while suspended from said core roller, and third removing the roll from said core roller.

2. A process for making tubular bread rolls, consisting in first forming through rolling pressure between two surfaces one of which is that of a core roller and the other that of a support a lump of dough about said core roller into tubular form and uniting the longitudinal joint thereof to hold the roll in form, second raising the dough while suspended from said core roller, third baking the roll while suspended from said core roller, and fourth removing the roll from said core roller.

In testimony whereof I affix my signature.

CHARLES RAY HASKELL.